United States Patent
Obrecht et al.

(10) Patent No.: US 8,615,805 B1
(45) Date of Patent: Dec. 24, 2013

(54) SYSTEMS AND METHODS FOR DETERMINING IF A PROCESS IS A MALICIOUS PROCESS

(75) Inventors: Mark Obrecht, Austin, TX (US); Shane Pereira, Newbury Park, CA (US)

(73) Assignee: Symantec Corporation, Mountain View, CA (US)

( * ) Notice: Subject to any disclaimer, the term of this patent is extended or adjusted under 35 U.S.C. 154(b) by 1284 days.

(21) Appl. No.: 12/203,788

(22) Filed: Sep. 3, 2008

(51) Int. Cl.
   *G06F 11/00* (2006.01)

(52) U.S. Cl.
   USPC .................. 726/24; 726/22; 726/23; 726/25; 713/188

(58) Field of Classification Search
   USPC ........................................ 726/22–25; 713/188
   See application file for complete search history.

(56) References Cited

U.S. PATENT DOCUMENTS

| | | | |
|---|---|---|---|
| 7,530,106 B1 * | 5/2009 | Zaitsev et al. | 726/24 |
| 7,831,412 B1 * | 11/2010 | Sobel et al. | 702/186 |
| 2006/0174319 A1 * | 8/2006 | Kraemer et al. | 726/1 |
| 2008/0016339 A1 * | 1/2008 | Shukla | 713/164 |
| 2008/0141376 A1 * | 6/2008 | Clausen et al. | 726/24 |
| 2009/0064336 A1 * | 3/2009 | Garbow et al. | 726/24 |
| 2009/0083855 A1 * | 3/2009 | Apap et al. | 726/24 |
| 2009/0138967 A1 * | 5/2009 | Faieta et al. | 726/22 |
| 2010/0031353 A1 * | 2/2010 | Thomas et al. | 726/22 |

* cited by examiner

*Primary Examiner* — April Y Blair
*Assistant Examiner* — Joseph Pan
(74) *Attorney, Agent, or Firm* — Holland & Hart LLP (57) ABSTRACT

A method for classifying a process that modifies a registry attribute is described. At least one attribute associated with a registry is monitored. A determination is made that the at least one attribute has been modified. The process that modified the at least one attribute is identified. One or more characteristics of the identified process is evaluated. The identified process is classified based on the evaluation of the one or more characteristics of the identified process.

14 Claims, 10 Drawing Sheets

SYSTEMS AND METHODS FOR DETERMINING IF A PROCESS IS A MALICIOUS PROCESS

BACKGROUND

Computer systems have increasingly become an integral part of the businesses world and the activities of individual consumers. For example, computer systems are used to complete transactions, store data, provide information, etc. An operating system is the software component of a computer system that manages and coordinates processes executed by the system. In addition, the operating system manages and coordinates the various resources of the computer system.

Computer systems include multiple directories. One such directory is a registry. A registry is a directory that stores settings and options for the operating system. The registry includes information and settings for hardware, operating system software, non-operating system software, users, etc. Users of computer systems often desire to alter various settings of the computer in order to tailor the performance of the computer to their needs. For example, users may modify information and settings included in the registry in order to customize the performance of the computer.

On occasion, malicious processes (i.e., applications) attempt to disrupt the performance and efficiency of the operating system by modifying settings in the registry. These malicious processes interfere with a user's ability to troubleshoot the computer system. In addition, the malicious process may also prohibit a user from exploring the functions and capabilities provided by the computer system. For example, in order to disrupt the performance of the operating system and interfere with the user's ability to operate the computer system, it may be advantageous for the malicious process to disable the user's ability to edit the registry, and manage tasks running on the operating system. In addition, it may be advantageous for the malicious process to disable firewalls and the ability of the computer system to automatically download updates for software, security protocols, etc. As such, benefits may be realized by providing improved systems and methods for identifying nefarious behavior in a computer system and determining a classification for the process that carried out the malicious behavior.

SUMMARY

A method for classifying a process that modifies a registry attribute is described. At least one attribute associated with a registry is monitored. A determination is made that the at least one attribute has been modified. The process that modified the at least one attribute is identified. One or more characteristics of the identified process are evaluated. The identified process is classified based on the evaluation of the one or more characteristics of the identified process.

In one embodiment, the at least attribute associated with the registry is selected from the group consisting of: a registry edit attribute, a task manager attribute, a firewall attribute, and an automatic update attribute. The identified process may be classified as a malicious process or a non-malicious process based on the evaluation of the one or more characteristics of the identified process. A determination may be made as to whether the at least one attribute is disabled.

In one configuration, a conviction score is calculated for the process based on the evaluation of the one or more characteristics of the process. A determination may be made as to whether the conviction score satisfies a pre-determined threshold. The process may be classified as a malicious process if the conviction score satisfies the pre-determined threshold. In one embodiment, it is advantageous for the malicious process to disable one or more attributes selected from the group consisting of: a registry edit attribute, a task manager attribute, a firewall attribute, and an automatic update attribute.

A computing device configured to classify a process that modifies a registry attribute is also described. The device includes a processor and memory in electronic communication with the processor. The device further includes a monitoring module. The monitoring module is configured to monitor at least one attribute associated with a registry, and determine that the at least one attribute has been modified. The monitoring module is further configured to identify the process that modified the at least one attribute, and evaluate one or more characteristics of the identified process. In addition, the monitoring module is configured to classify the identified process based on the evaluation of the one or more characteristics of the identified process.

A computer-program product for classifying a process that modifies a registry attribute is also described. The computer-program product includes a computer-readable medium having instructions thereon. The instructions include code programmed to monitor at least one attribute associated with a registry, and code programmed to determine that the at least one attribute is modified. The instructions further include code programmed to identify the process that modified the at least one attribute, and code programmed to evaluate one or more characteristics of the identified process. In addition, the instructions include code programmed to classify the identified process based on the evaluation of the one or more characteristics of the identified process.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
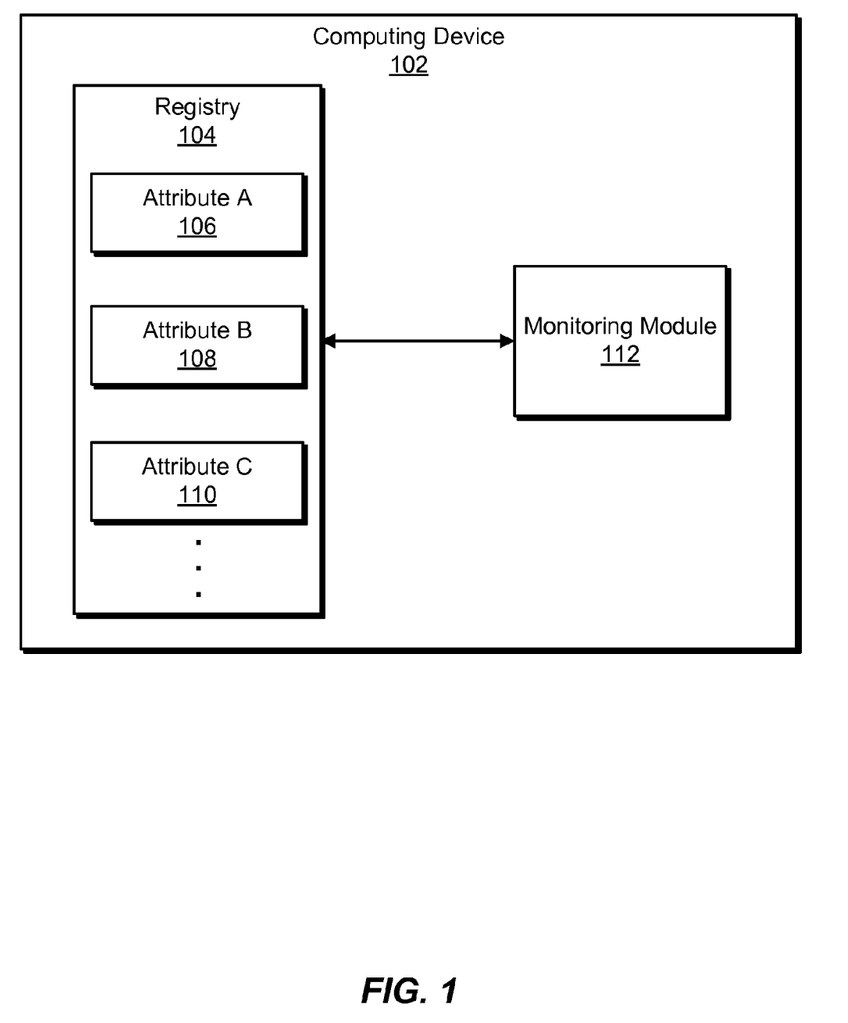
FIG. 1 is a block diagram illustrating one embodiment of a computing device.

FIG. 1 is a block diagram illustrating one embodiment of a computing device 102. The computing device 102 may be a personal computer, a laptop, a handheld device, or any other type of computing device. In one embodiment, the computing device 102 includes a registry 104 and a monitoring module 112. The registry may be a directory that stores settings and options for the operating system operating on the computing device 102. The registry 104 may also include information and settings for the hardware, operating system software, non-operating system software, users, preferences of the computing device 102, etc. In one embodiment, when a user of the computer device 102 makes changes to certain settings, file associations, system policies, or other installed software, these changes may be reflected and stored in the registry 104.

In one configuration, the registry 104 may include one or more attributes. For example, the registry 104 may include attribute A 106, attribute B 108, attribute C 110, etc. While only three attributes are illustrated, the registry 104 may include more or less attributes. Registry attributes 106, 108, 110 may describe the functions of the registry 104. For example, a registry attribute may be the capability to be manually edited (also known as "registry edit"). If the computer device 102 is running the Microsoft Windows® operating system, the registry 104 may be manually edited by running the regedit.exe or the regedit32.exe processes.

In another example, a registry attribute may describe the settings for a firewall operating on the computing device 102. A firewall may regulate the flow of traffic to or from the computing device 102. In a further example, a registry attribute may be the capability to manage tasks running on the computing device. For example, a user of the computing device 102 that is running the Microsoft Windows® operating system may manage the various tasks running on the computing device 102 by depressing certain keys on a keyboard input. In one embodiment, a user may depress the keys "control, alt, and delete" simultaneously and a list of processes (i.e., tasks) currently running on the computing device 102 may appear. The user may then manage these various processes.

A further example of a registry attribute may be the capability to automatically update the operating system and other installed components of the computing device 102. For example, security updates for the operating system may be automatically installed on the computing device 102 in order to keep the operating system up to date.

As previously mentioned, the monitoring module 112 may continuously monitor the registry 104 for changes to one or more attributes 106, 108, 110. In one embodiment, the monitoring module 112 may monitor the registry 104 in order to detect when an attribute has been disabled. For example, the monitoring module 112 may detect when the capability to manually edit the registry 104 has been disabled. The monitoring module 112 may also detect when the firewall for the computing device has been disabled. In addition, the monitoring module 112 may detect when the ability to manage tasks has been disabled. Further, the monitoring module 112 may detect when the capability to automatically update the operating system has been disabled. The disablement of any of the above-mentioned attributes by modifying the registry 104 may significantly hinder the performance of the computing device 102.

Figure 2:
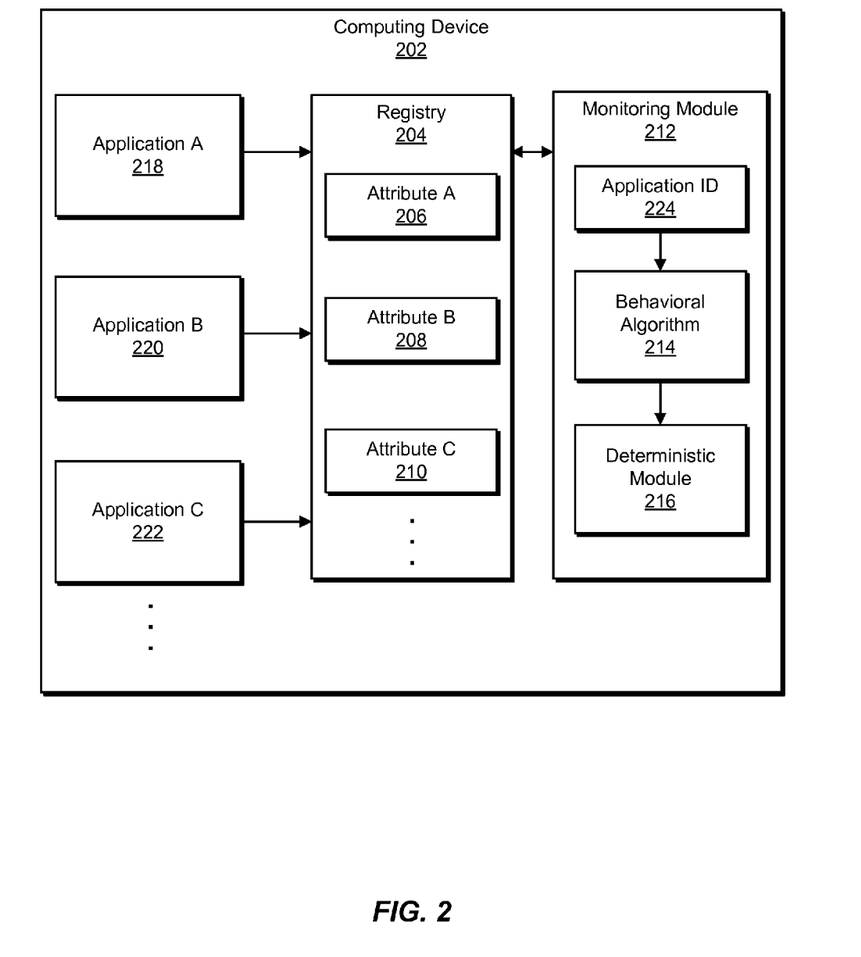
FIG. 2 is a block diagram illustrating a further embodiment of a computing device.

FIG. 2 is a block diagram illustrating a further embodiment of a computing device 202. The computing device 202 may include one or more applications (i.e., processes) 218, 220, 222, that may be running on the computing device 202. A registry 204, with various attributes 206, 208, 210, and a monitoring module 212 may also be included in the computing device 202.

In one embodiment, the monitoring module 212 may be a behavioral security detection system that monitors the registry 204 for changes in the registry 204, identifies the application that modified the registry 204, and determines a classification for the identified application. For example, upon detecting a change in the registry 204, the monitoring module 212 may determine whether an application that caused the change to the registry 204 is a malicious application or a non-malicious application. Malicious applications may be computer viruses, worms, etc. that disrupt the performance of one or more functions of the computing device 202.

In one embodiment, the monitoring module 212 includes an application identification module 224, a behavioral algorithm 214, and a deterministic module 216. As previously explained, the monitoring module 212 may monitor the registry 204 for changes to one or more of the attributes of the registry 204. As an example, application A 218 may change attribute A 206. In other words, in this example, application A 218 may disable attribute A 206. The monitoring module 212 detects the disablement of attribute A 206 and records the identification 224 of the application that disabled the attribute.

In one configuration, the behavioral algorithm 214 may evaluate characteristics associated with the application that changed (i.e., disabled) the attribute of the registry 204. The deterministic module 216 may determine a classification for the application based on the evaluation of the application by the behavioral algorithm 214. For example, the deterministic module 216 may determine whether application A 218 is classified as a malicious application or a non-malicious application.

Figure 3:
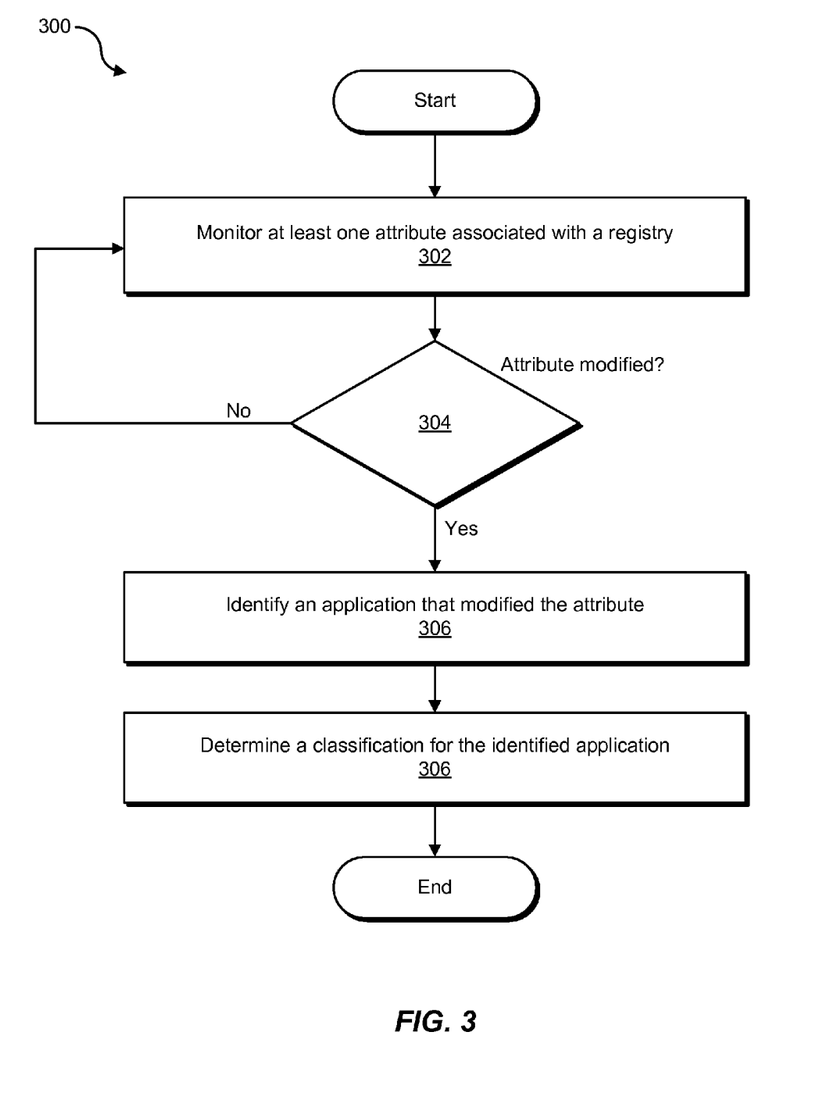
FIG. 3 is a flow diagram illustrating one embodiment of a method for identifying changes to a registry of a computing device and classifying an application that changed the registry.

FIG. 3 is a flow diagram illustrating one embodiment of a method 300 for identifying changes to a registry of a computing device and classifying an application that changed the registry. The method 300 may be implemented by the computing device 102. More specifically, the method 300 may be implemented by the monitoring module 112 as previously explained.

The method 300 begins and at least one attribute associated with the registry may be monitored 302. As mentioned above, an attribute may describe various functions and capabilities of the registry 104. A determination 304 may be made whether a monitored attribute is modified. If it is determined 304 that a monitored attribute is not modified, the method 300 continues to monitor the at least one attribute associated with the registry. However, if it is determined 304 that a monitored attribute is modified, an application is identified 306 that modified the attribute. The application that modified the attribute may be a software process running on the computing device 102. In one embodiment, a classification for the identified application may be determined 306. In one example, a "malicious" or a "non-malicious" classification may be determined 306 for the identified application. In addition, other classifications may be determined 306 for the identified application. For example, an identified application may be classified as a potentially malicious application, a potentially non-malicious application, etc. Details regarding the classification determination for the identified application will be explained further in relation to FIG. 4.

Figure 4:
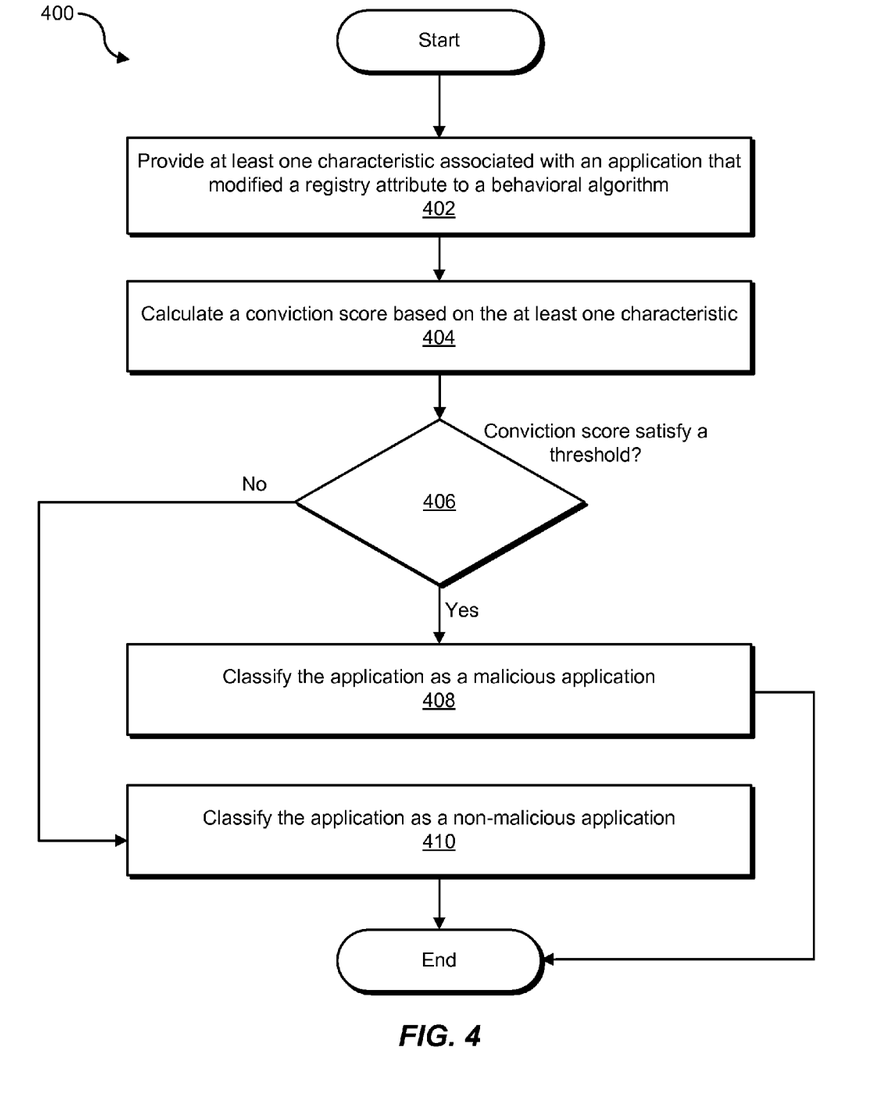
FIG. 4 is a flow diagram illustrating one embodiment of a method for determining a classification of an application that modified an attribute of a registry.

FIG. 4 is a flow diagram illustrating one embodiment of a method 400 for determining a classification of an application that modified an attribute of a registry. The method 400 may be implemented by the monitoring module 212. More specifically, the method 400 may be implemented by the behavioral algorithm 214 and the deterministic module 216.

In one embodiment, at least one characteristic associated with an application that modified the registry attribute is provided 402 to a behavioral algorithm. An example of a characteristic may be an indicator that the application changed a registry attribute. A conviction score based on the at least one characteristic may be calculated 404. In one embodiment, the behavioral algorithm 214 calculates 404 the conviction score.

The conviction score may be calculated 404 by a decision/conviction system (e.g., the monitoring module 212) by identifying and programmatically weighting various characteristics of a running process. For example, these programmatic weights (or scores) may be represented by integer scores (e.g., +5 or +10 per characteristic). If the sum, product, etc. of the programmatic weights reaches a threshold, a conviction may be triggered and the process may be classified as a malicious process.

Some examples of characteristics used to calculate a conviction score (in addition to the characteristic to disable registry attributes) may include a nefarious keylogging characteristic, a screen capture characteristic, and a character replacement characteristic. Regarding the character replacement characteristic, a malicious process may have a name similar to a non-malicious process in order to deceive a user (e.g., a malicious process is named "iexpl0re.exe" and the non-malicious process is named "iexplore.exe"). Each of the above-described characteristics may be assigned a programmatic weight (or score) and the total of these weights may be a conviction score for a process.

A determination 406 may be made as to whether or not the calculated conviction score satisfies a predetermined threshold. If it is determined 406 that the conviction score does not satisfy the predetermined threshold, the application may be classified 410 as a non-malicious application (i.e., a safe application for the computing device). However, if it is determined 406 that the conviction score satisfies the predetermine threshold, the application may be classified 408 as a malicious application (i.e., a non-safe application).

Figure 5:
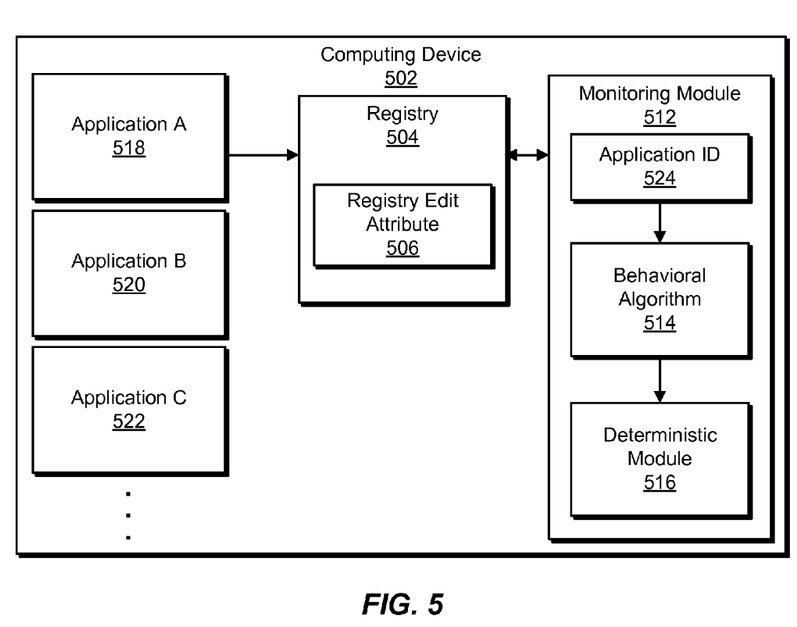
FIG. 5 is another embodiment of a computing device.

FIG. 5 is one embodiment of a computing device 502 as previously explained. The computing device 502 may include a registry 504, multiple applications 518, 520, 522 and a monitoring module 512. In one embodiment, the registry 504 includes a registry edit attribute 506. The registry edit attribute 506 allows a user to edit information and settings of the registry 504.

In one embodiment, the monitoring module 512 monitors the registry 504 to determine whether an application has disabled the registry edit attribute 506. For example, an application (such as application A 518) may disable the registry edit attribute 506 in the following manner:
HKEY_CURRENT_USER\Software\Microsoft\Windows\Current
Version\Policies\System
Dword (Reg): DisableRegistryTools
1=disables registry tools
0=enables registry tools Application A 518 may also disable the registry edit attribute 506 in the following manner:
HKEY_LOCAL_MACHINE\Software\Microsoft\Windows\Current
Version\Policies\System
Dword (Reg): DisableRegistryTools
1=disables registry tools
0=enables registry tools In one embodiment, when the monitoring module 512 detects the disablement of the registry edit attribute 506, an application identification module 524 obtains the identification of the application that disabled the attribute 506 (i.e., application A 518). A behavioral algorithm 514 may evaluate at least one characteristic of application A 518 and calculate a conviction score based on the evaluation. The behavioral algorithm 514 may use various characteristics of application A 518 to calculate the conviction score. One example of a characteristic is the disablement of a registry attribute, such as the registry edit attribute 506. In one embodiment, the behavioral algorithm 514 assigns the calculated conviction score to the application identified by the application identification module 524.

A deterministic module 516 may receive and analyze the conviction score calculated by the behavioral algorithm 514. The deterministic module 516 may classify the application assigned to the conviction score. For example, the deterministic module 516 may classify application A 518 as a malicious application or a non-malicious application based upon the conviction score.

Figure 6:
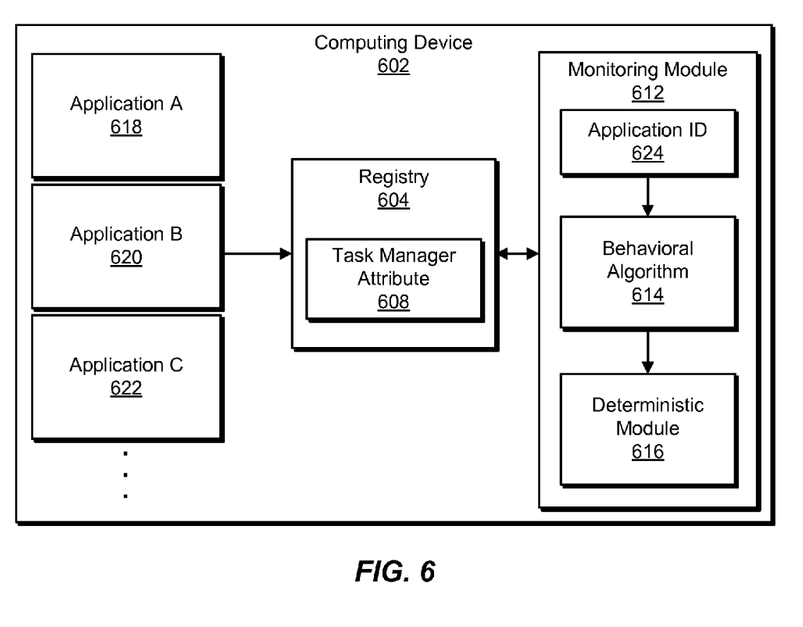
FIG. 6 is a further configuration of a computing device.

FIG. 6 is another example of a computing device 602 as previously explained. The computing device 602 may include a registry 604, multiple applications 618, 620, 622 and a monitoring module 612. In one embodiment, the registry 604 includes a task manager attribute 608. The task manager attribute 608 allows a user to manage various tasks (i.e., processes, applications, etc.) running on the computing device 602.

In one embodiment, the monitoring module 612 monitors the registry 604 to determine whether an application has disabled the task manager attribute 608. For example, an application (such as application B 620) may disable the task manager attribute 608 in the following manner:
HKEY_CURRENT_USER\Software\Microsoft\Windows\Current
VersionTolicies\System
Dword (Reg): DisableTaskMgr
1=disables task manager
0=enables task manager Application B 620 may also disable the task manager attribute 608 in the following manner:
HKEY_LOCAL_MACHINE\Software\Microsoft\Windows\Current
Version\Policies\System
Dword (Reg): Disable TaskMgr
1=disables task manager
0=enables task manager In one embodiment, when the monitoring module 612 detects the disablement of the task manager attribute 608, an application identification module 624 obtains the identification of the application that disabled the attribute 608 (i.e., application B 620). A behavioral algorithm 614 may evaluate at least one characteristic of application B 620 and calculate a conviction score based on the evaluation. The behavioral algorithm 614 may use various characteristics of application B 620 to calculate the conviction score. One example of a characteristic is the disablement of a registry attribute, such as the task manager attribute 608. In one embodiment, the behavioral algorithm 614 assigns the calculated conviction score to the application identified by the application identification module 624.

A deterministic module 616 may receive and analyze the conviction score calculated by the behavioral algorithm 614. The deterministic module 616 may classify the application assigned to the conviction score. For example, the deterministic module 616 may classify application B 620 as a malicious application or a non-malicious application based upon the conviction score.

Figure 7:
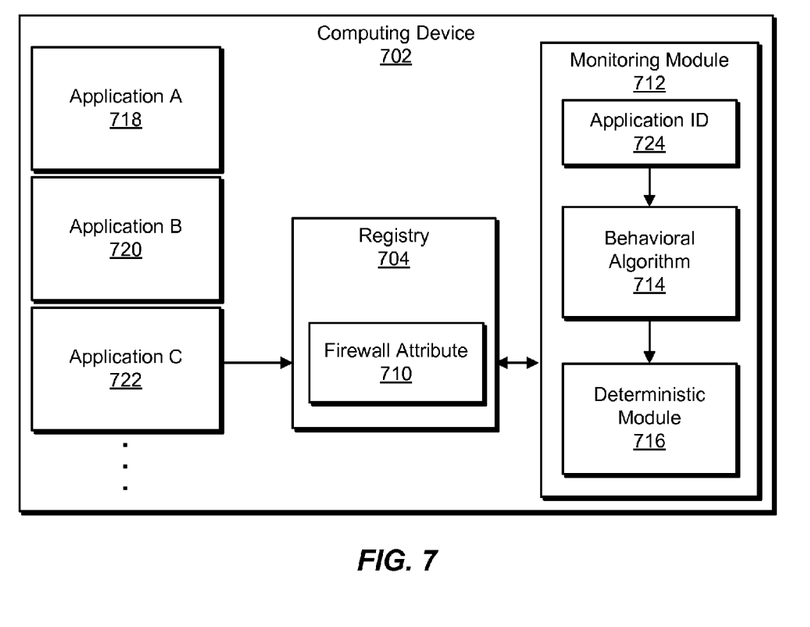
FIG. 7 is an additional example of a computing device.

FIG. 7 is a further configuration of a computing device 702 as previously explained. The computing device 702 may include a registry 704, multiple applications 718, 720, 722 and a monitoring module 712. In one embodiment, the registry 704 includes a firewall attribute 710. The firewall 710 regulates the flow of traffic to and from the computing device 702.

In one embodiment, the monitoring module 712 monitors the registry 704 to determine whether an application has disabled the firewall 710. For example, an application (such as application C 722) may disable the firewall 710 in the following manner:

HKEY_CURRENT_USER\System\CurrentControlSet\Services\
   SharedAccess\Paremeters\FirewallPolicy\StandardProfile
   Dword (Reg): EnableFirewall
   0=disables firewall
   1=enables firewall Application C 722 may also disable the firewall 710 in the following manner:

HKEY_LOCAL_MACHINE\System\CurrentControlSet\Services\
   SharedAccess\Paremeters\FirewallPolicy\StandardProfile
   Dword (Reg): EnableFirewall
   0=disables firewall
   1=enables firewall In one embodiment, when the monitoring module 712 detects the disablement of the firewall 710, an application identification module 724 obtains the identification of the application that disabled the attribute 710 (i.e., application C 722). A behavioral algorithm 714 may evaluate at least one characteristic of application C 722 and calculate a conviction score based on the evaluation. The behavioral algorithm 714 may use various characteristics of application C 722 to calculate the conviction score. One example of a characteristic is the disablement of a registry attribute, such as the firewall attribute 710. In one embodiment, the behavioral algorithm 714 assigns the calculated conviction score to the application identified by the application identification module 724.

A deterministic module 716 may receive and analyze the conviction score calculated by the behavioral algorithm 714. The deterministic module 716 may classify the application assigned to the conviction score. For example, the deterministic module 716 may classify application C 722 as a malicious application or a non-malicious application based upon the conviction score.

Figure 8:
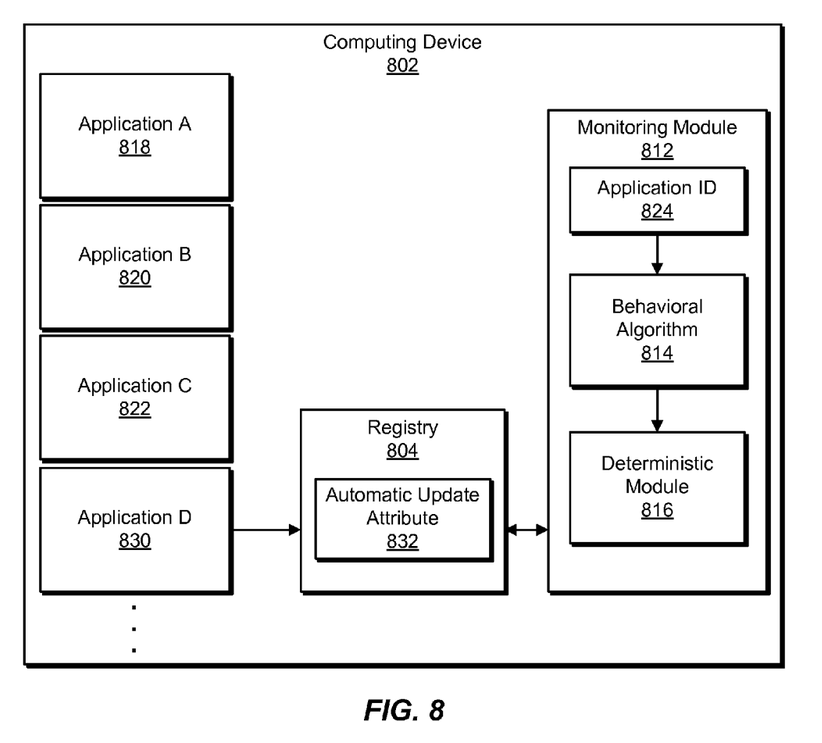
FIG. 8 is another embodiment of a computing device.

FIG. 8 is an additional example of a computing device 802 as previously explained. The computing device 802 may include a registry 804, multiple applications 818, 820, 822, 830 and a monitoring module 812. In one embodiment, the registry 804 includes an automatic update attribute 832. The automatic update attribute 832 automatically updates the operating system and other installed components of the computing device 802.

In one embodiment, the monitoring module 812 monitors the registry 804 to determine whether an application has disabled the automatic update attribute 832. For example, an application (such as application D 830) may disable the automatic update attribute 832 in the following manner:

HKEY_CURRENT_USER\Software\Policies\Microsoft\Windows\WindowsUpdate\AU
   Dword (Reg): NoAutoUpdate
   0=enable automatic updates
   1=disable automatic updates Application D 830 may also disable the automatic update attribute 832 in the following manner:

HKEY_LOCAL_MACHINE\Software\Policies\Microsoft\Windows\WindowsUpdate\AU
   Dword (Reg): NoAutoUpdate
   0=enable automatic updates
   1=disable automatic updates In one embodiment, when the monitoring module 812 detects the disablement of the automatic update attribute 832, an application identification module 824 obtains the identification of the application that disabled the attribute 832 (i.e., application D 830). A behavioral algorithm 814 may evaluate at least one characteristic of application D 830 and calculate a conviction score based on the evaluation. The behavioral algorithm 814 may use various characteristics of application D 830 to calculate the conviction score. One example of a characteristic is the disablement of a registry attribute, such as the automatic update attribute 832. In one embodiment, the behavioral algorithm 814 assigns the calculated conviction score to the application identified by the application identification module 824.

A deterministic module 816 may receive and analyze the conviction score calculated by the behavioral algorithm 814. The deterministic module 816 may classify the application assigned to the conviction score. For example, the deterministic module 816 may classify application D 830 as a malicious application or a non-malicious application based upon the conviction score.

The registry attributes described above (i.e., registry edit, task manager, firewall, and automatic updates) are but a few examples of attributes that may be monitored and evaluated when calculating a conviction score. The present systems and methods may monitor and evaluate any number of registry attributes to calculate a conviction score in order to determine whether a process is a malicious process. Further, the present systems and methods may monitor and evaluate other actions executed by the process in order to calculate a conviction score. For example, the process may perform nefarious keylogging, screen capture, or character replacement. The present systems and methods may evaluate these actions and calculate a conviction score for the process.

Figure 9:
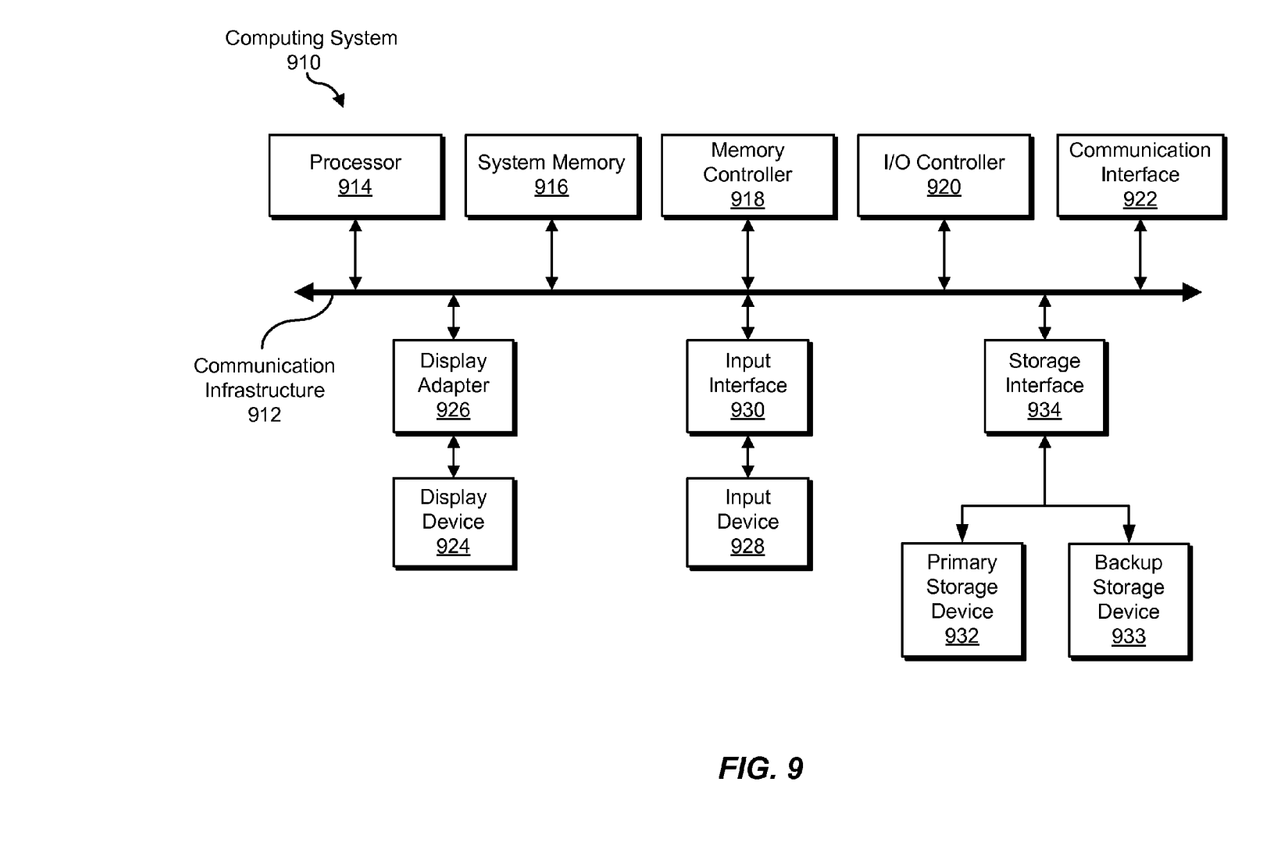
FIG. 9 is a block diagram of an exemplary computing system.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may comprise at least one processor 914 and system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the monitoring, determining, identifying, evaluating, and classifying steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may comprise both a volatile memory unit (such as, for example, system memory 916) and a non-volatile storage device (such as, for example, primary storage device 932, as described in detail below).

In certain embodiments, exemplary computing system 910 may also comprise one or more components or elements in addition to processor 914 and system memory 916. For example, as illustrated in FIG. 9, computing system 910 may comprise a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the steps or features described and/or illustrated herein, such as monitoring, determining, identifying, evaluating, and classifying.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for monitoring, determining, identifying, evaluating, and classifying steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network comprising additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the monitoring, determining, identifying, evaluating, and classifying steps disclosed herein. Communication interface 922 may also be used to perform and/or be a means for performing other steps and features set forth in the instant disclosure.

As illustrated in FIG. 9, computing system 910 may also comprise at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also comprise at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the monitoring, determining, identifying, evaluating, and classifying steps disclosed herein. Input device 928 may also be used to perform and/or be a means for performing other steps and features set forth in the instant disclosure.

As illustrated in FIG. 9, exemplary computing system 910 may also comprise a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also comprise other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Storage devices 932 and 933 may also be used, for example, to perform and/or be a means for performing, either alone or in combination with other elements, one or more of the monitoring, determining, identifying, evaluating, and classifying steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

Figure 10:
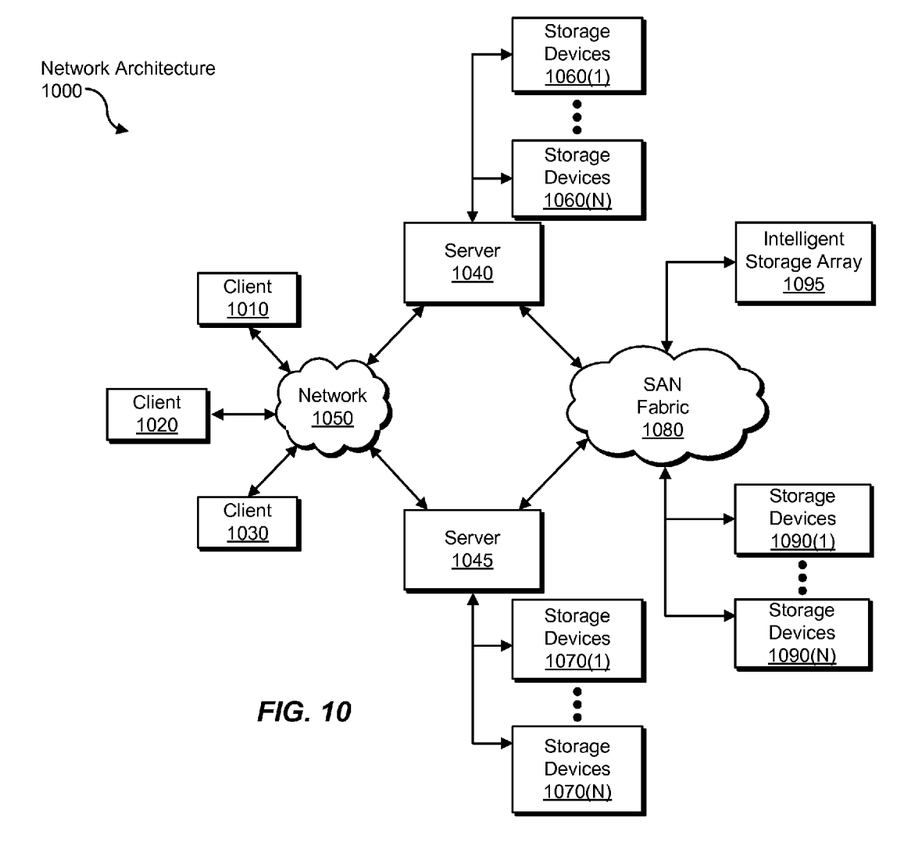
FIG. 10 is a block diagram of an exemplary network architecture in which client systems and servers may be coupled to a network.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or to run certain software applications. Network 1050 generally represents any telecommunication or computer network; including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 880 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the monitoring, determining, identifying, evaluating, and classifying steps disclosed herein. Network architecture 1000 may also be used to perform and/or be a means for performing other steps and features set forth in the instant disclosure.

As detailed above, computing system 910 and/or one or more of the components of network architecture 1000 may perform and/or be a means for performing, either alone or in combination with other elements, one or more steps of the exemplary methods described and/or illustrated herein. For example, computing system 910 and/or one or more of the components of network architecture 1000 may perform and/or be a means for performing a computer-implemented method for classifying an application that disables a registry attribute and that may comprise: 1) monitoring at least one attribute associated with a registry; 2) determining that the at least one attribute has been modified; 3) identifying the process that modified the at least one attribute; 4) evaluating one or more characteristics of the identified process; and 5) classifying the identified process based on the evaluation of the one or more characteristics of the identified process. The network resource may represent a networked device or a network service.

In one example, classifying an application that disables a registry attribute may comprise: 1) monitoring at least one attribute associated with a registry; 2) determining that the at least one attribute has been modified; 3) identifying the process that modified the at least one attribute; 4) evaluating one or more characteristics of the identified process; and 5) classifying the identified process based on the evaluation of the one or more characteristics of the identified process.

Computing system 910 and/or one or more of the components of network architecture 1000 may also perform and/or be a means for classifying an application that disables a registry attribute by: 1) monitoring at least one attribute associated with a registry; 2) determining that the at least one attribute has been modified; 3) identifying the process that modified the at least one attribute; 4) evaluating one or more characteristics of the identified process; and 5) classifying the identified process based on the evaluation of the one or more characteristics of the identified process.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

The invention claimed is:

1. A method for classifying a process that disables a registry attribute, the method comprising:

monitoring, by a hardware processor, at least one attribute of a registry that relates to a setting of an operating system, wherein the at least one attribute of the registry is selected from the group comprising at least one of: a registry edit attribute, a task manager attribute, a firewall attribute, or an automatic update attribute;

determining, by the hardware processor, that the at least one attribute of the registry has been disabled;

identifying, by the hardware processor, the process that disabled the at least one attribute;

evaluating, by the hardware processor, one or more characteristics of the identified process, wherein the one or more characteristics comprise an indicator to confirm that the identified process disabled the at least one attribute of the registry; and classifying, by the hardware processor, the identified process based on the evaluation of the one or more characteristics of the identified process.

2. The method of claim 1, further comprising classifying the identified process as a malicious process or a non-malicious process based on the evaluation of the one or more characteristics of the identified process.

3. The method of claim 1, further comprising calculating a conviction score for the process based on the evaluation of the one or more characteristics of the process.

4. The method of claim 3, further comprising determining whether the conviction score satisfies a pre-determined threshold.

5. The method of claim 4, further comprising classifying the process as a malicious process if the conviction score satisfies the pre-determined threshold.

6. The method of claim 5, wherein the malicious process disables one or more attributes selected from the group consisting of: a registry edit attribute, a task manager attribute, a firewall attribute, and an automatic update attribute.

7. A computing device configured to classify a process that disables a registry attribute, the computing device comprising:
- a processor;
- memory in electronic communication with the processor, the memory storing executable instructions that, when executed by the processor, cause the processor to:
  - monitor at least one attribute of a registry that relates to a setting of an operating system, wherein the at least one attribute of the registry is selected from the group comprising at least one of: a registry edit attribute, a task manager attribute, a firewall attribute, or an automatic update attribute;
  - determine that the at least one attribute of the registry has been disabled;
  - identify the process that disabled the at least one attribute;
  - evaluate one or more characteristics of the identified process, wherein the one or more characteristics comprise an indicator to confirm that the identified process disabled the at least one attribute of the registry; and
  - classify the identified process based on the evaluation of the one or more characteristics of the identified process.

8. The device of claim 7, wherein the processor is further configured to classify the identified process as a malicious process or a non-malicious process based on the evaluation of the one or more characteristics of the identified process.

9. The device of claim 7, wherein the processor is further configured to calculate a conviction score for the process based on the evaluation of the one or more characteristics of the process.

10. The device of claim 9, wherein the processor is further configured to classify the process as a malicious process if the conviction score satisfies a pre-determined threshold.

11. A computer-program product for classifying a process that disables a registry attribute, the computer-program product comprising a non-transitory computer-readable storage medium storing executable instructions that, when executed by a processor, cause the processor to:
- monitor at least one attribute of a registry that relates to a setting of an operating system, wherein the at least one attribute of the registry is selected from the group comprising at least one of: a registry edit attribute, a task manager attribute, a firewall attribute, or an automatic update attribute;
- determine that the at least one attribute of the registry has been disabled;
- identify the process that disabled the at least one attribute;
- evaluate one or more characteristics of the identified process, wherein the one or more characteristics comprise an indicator to confirm that the identified process disabled the at least one attribute of the registry; and
- classify the identified process based on the evaluation of the one or more characteristics of the identified process.

12. The computer-program product of claim 11, wherein the instructions, when executed by the processor, further cause the processor to classify the identified process as a malicious process or a non-malicious process based on the evaluation of the one or more characteristics of the identified process.

13. The computer-program product of claim 11, wherein the instructions, when executed by the processor, further cause the processor to calculate a conviction score for the process based on the evaluation of the one or more characteristics of the process.

14. The computer-program product of claim 13, wherein the instructions, when executed by the processor, further cause the processor to classify the process as a malicious process if the conviction score satisfies a pre-determined threshold.

* * * * *